United States Patent
Iritani et al.

(10) Patent No.: US 6,293,123 B1
(45) Date of Patent: Sep. 25, 2001

(54) REFRIGERATION CYCLE DEVICE

(75) Inventors: Kunio Iritani, Anjo; Satoshi Itoh, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/627,833

(22) Filed: Jul. 28, 2000

(30) Foreign Application Priority Data

Jul. 30, 1999 (JP) .................................................. 11-217898

(51) Int. Cl.$^7$ .............................. F25D 17/06; F25B 41/00
(52) U.S. Cl. .................. 62/409; 62/90; 62/197; 62/513
(58) Field of Search .............................. 62/197, 513, 90, 62/159, 409

(56) References Cited

U.S. PATENT DOCUMENTS

| | | | |
|---|---|---|---|
| 5,704,219 | 1/1998 | Suzuki et al. | 62/222 |
| 5,848,537 | 12/1998 | Biancardi et al. | 62/324.6 |
| 5,878,589 | 3/1999 | Tanaka et al. | 62/199 |
| 5,934,094 * | 8/1999 | Itoh et al. | 62/222 |
| 5,983,652 * | 11/1999 | Iritani et al. | 62/197 |

FOREIGN PATENT DOCUMENTS

A-58-37457  3/1983  (JP).
A-3-294750  12/1991  (JP).

* cited by examiner

*Primary Examiner*—William Wayner
(74) *Attorney, Agent, or Firm*—Harness, Dickey & Pierce, PLC

(57) ABSTRACT

During a heating mode, higher-pressure refrigerant having passed through a condenser within an air-conditioning duct is divided into two portions. One portion is depressurized by a first depressurizing device to an intermediate pressure. Heat exchange is performed in a refrigerant-refrigerant heat exchanger between the other portion of the higher-pressure refrigerant having just passed through the condenser and the intermediate-pressure refrigerant having just passed through the first depressurizing device. During the heating mode, the higher-pressure refrigerant cooled in refrigerant-refrigerant heat exchanger 23 is supercooled by a supercooling device within the air-conditioning duct. Then, the supercooled higher-pressure refrigerant is depressurized by a second depressurizing device to a lower pressure, thereby vaporized in an outdoor heat-exchanger.

13 Claims, 11 Drawing Sheets

POSITION OF
TEMPERATURE-CONTROL LEVER 51

FIG. 8

| VALVE, DOOR / OPERATION, MODE | SOLENOID VALVE 28a | SOLENOID VALVE 28b | FIRST DEPRESSURIZING DEVICE 26 | SECOND DEPRESSURIZING DEVICE 27 | CHANGING-DOORS 16, 17 |
|---|---|---|---|---|---|
| HEATING | OPEN | CLOSE | CONTROLLED OPENING | CONTROLLED OPENING | OPEN |
| COOLING | CLOSE | OPEN | CLOSE | CLOSE | CLOSE |
| DEHUMIDIFYING | CLOSE | CLOSE | CLOSE | CONTROLLED OPENING | OPEN |

REFRIGERATION CYCLE DEVICE

CROSS-REFERENCE TO RELATED APPLICATION

The present invention is related to Japanese patent application No. Hei. 11-217898, filed Jul. 30, 1999; the contents of which are incorporated herein by reference.

FIELD OF THE INVENTION

The present invention relates generally to a heat-pump-type refrigeration-cycle device, and more particularly, to a heat-pump type refrigeration-cycle device that improves heating performance by using gas-injection.

BACKGROUND OF THE INVENTION

In JP-A-3-294750, conventionally, the following refrigeration method is disclosed. Higher-pressure refrigerant from the outlet of a condenser is divided to two portions. One of the divided-refrigerant portions is depressurized to an intermediate pressure by a first depressurizing device. This intermediate-pressure refrigerant exchanges heat with the other refrigerant portion to supercool the first. This supercooled refrigerant is depressurized by a second depressurizing device, and is introduced into an evaporator and vaporized therein. The intermediate-pressure refrigerant exchanges heat with the higher-pressure refrigerant, and is introduced into for compression into the compressor (gas-injection). The enthalpy difference (amount of heat-extraction) between the refrigerant at the inlet of an evaporator and the refrigerant at the outlet thereof is increased by supercooling the higher-pressure refrigerant, thereby improving the coefficient of performance (COP).

In the above-described prior device, heat exchange is performed only between the intermediate-pressure refrigerant and the higher-pressure refrigerant at the condenser outlet. Therefore, the higher-pressure refrigerant can be supercooled only to as high as the saturation temperature of the intermediate-pressure refrigerant. The present invention was developed in light of these drawbacks.

SUMMARY OF THE INVENTION

It is therefore an object of the present invention to increase the enthalpy difference (amount of heat-extraction) in an outdoor heat-exchanger during heating to improve the coefficient of performance (COP) in a heat-pump-type refrigeration-cycle device by gas-injection into a compressor.

In order to attain the above-described object, a refrigeration-cycle device is provided where higher-pressure refrigerant, having passed through condenser during a heating mode, is divided into two portions. One portion is depressurized by a first depressurizing device to an intermediate pressure. Then, heat exchange is performed in a refrigerant-refrigerant heat exchanger between the portion of the higher-pressure refrigerant having passed through condenser and the intermediate-pressure refrigerant having passed through the first depressurizing device. Further, a supercooling device is disposed within air-conditioning duct. The higher-pressure refrigerant, having been cooled in the refrigerant-refrigerant heat exchanger during the heating mode, exchanges heat with air within air-conditioning duct in the supercooling device. Then, the higher-pressure refrigerant, having been supercooled in the supercooling device, is depressurized to a lower pressure by the second depressurizing device. This refrigerant is vaporized in the outdoor heat-exchanger. Further, intermediate-pressure gas refrigerant, having been vaporized by the heat exchange in refrigerant-refrigerant heat exchanger during the heating mode, is introduced into the gas-injection port of compressor.

The higher-pressure refrigerant, having been cooled in refrigerant-refrigerant heat exchanger during the heating mode, is further supercooled in a supercooling device. Then, the supercooled higher-pressure refrigerant is depressurized to a lower pressure by second depressurizing device, and is vaporized in the outdoor heat-exchanger. Therefore, the amount of heat-extraction in the outdoor heat-exchanger can be increased by the amount of supercooling performed by the supercooling device. This increased amount of heat-extraction is radiated to the air within the air-conditioning duct through the supercooling device, thereby improving the coefficient of performance (COP).

Further, since gas-injection is performed by using a refrigerant-refrigerant heat exchanger, a gas-liquid separator for separating the gas and liquid intermediate-pressure refrigerant is not required. Therefore, the accumulator-cycle structure, where the lower-pressure refrigerant flows into intake port of compressor from accumulator disposed on the intake side of compressor, can be used.

In another aspect of the present invention, a higher-pressure refrigerant passes through a condenser for heating the air within air-conditioning duct during the heating mode, and is depressurized by first depressurizing device to an intermediate pressure. Then, the gas and liquid intermediate-pressure refrigerant having passed through this first depressurizing device is separated by a gas-liquid separator.

The intermediate-pressure liquid refrigerant, having been separated by gas-liquid separator during the heating mode, exchanges heat with the air within the air-conditioning duct in a supercooling device disposed within air-conditioning duct, and thereby is supercooled. The intermediate-pressure refrigerant, having been supercooled in this supercooling device, is depressurized by second depressurizing device to a lower pressure, and is vaporized in the outdoor heat-exchanger. The intermediate-pressure gas refrigerant, having been separated by gas-liquid separator during the heating mode, is introduced to gas-injection port of compressor.

During the heating mode, the intermediate-pressure liquid refrigerant from gas-liquid separator further exchanges heat with the air within air-conditioning duct in supercooling device, and is thereby supercooled. This supercooled intermediate-pressure refrigerant is depressurized by second depressurizing device, and is vaporized in outdoor heat-exchanger. Therefore, the amount of heat-extraction in outdoor heat-exchanger can be increased by the amount of supercooling performed by supercooling device, as in the invention defined in claim 1, thereby improving the coefficient of performance (COP) during the heating mode.

In another aspect of the present invention, an evaporator is disposed upstream of condenser in an airflow direction in an air-conditioning duct, and a third depressurizing device is disposed on the inlet side of the refrigerant passage of this evaporator. During a cooling mode, the higher-pressure gas refrigerant from compressor is condensed in the outdoor heat-exchanger. The higher-pressure refrigerant, having passed through this outdoor heat-exchanger, is depressurized by third depressurizing device to a lower pressure, and this lower-pressure refrigerant is vaporized in evaporator.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 8 is a table illustrating the operation of valves and doors of a heat-pump-type refrigeration-cycle device according to the present invention;

DETAILED DESCRIPTION OF THE PREFERRED EMBODIMENTS

Figure 1:
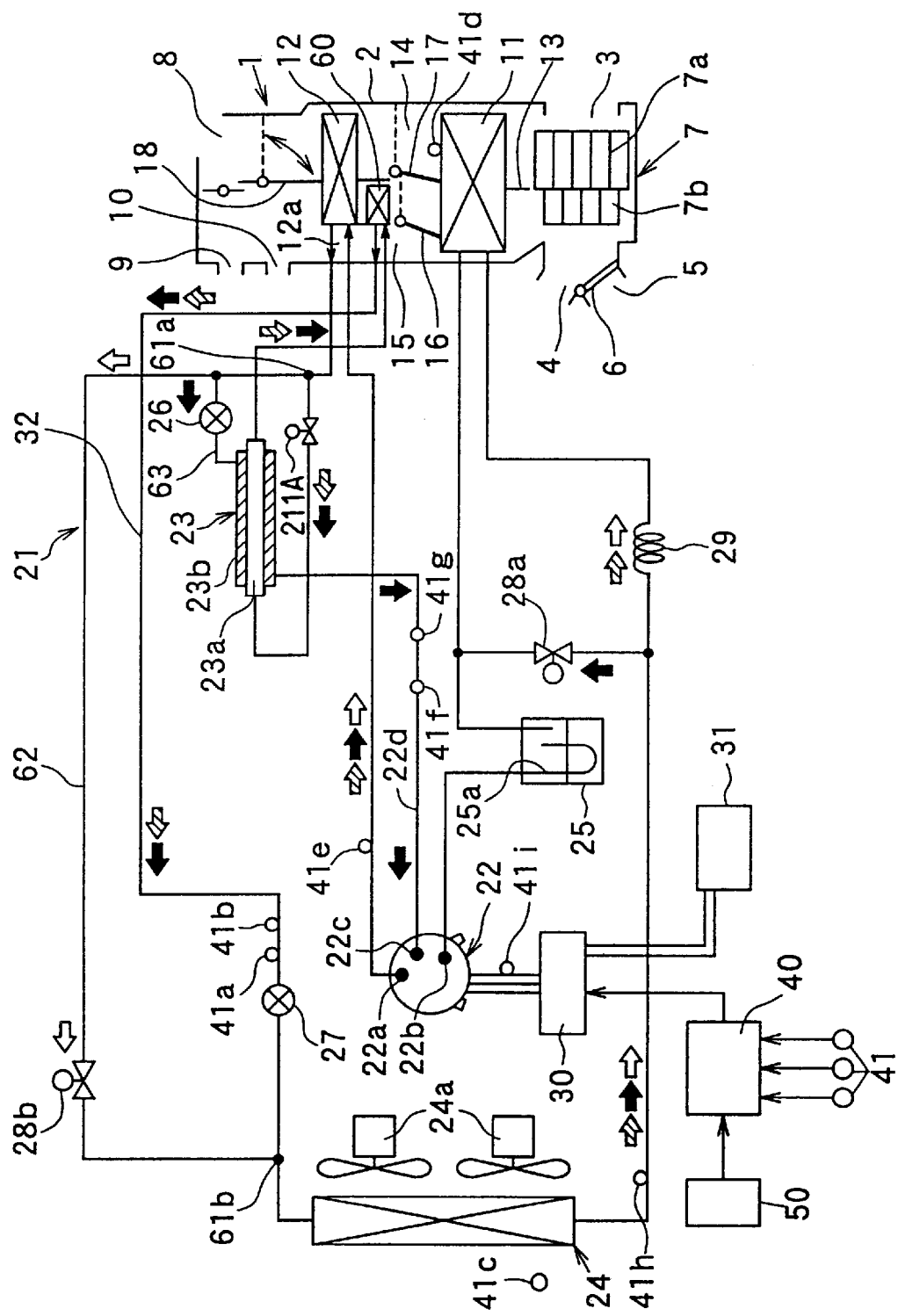
FIG. 1 is a schematic view of a refrigeration cycle diagram of a heat-pump-type refrigeration-cycle device according to the present invention.

FIG. 1 shows an air-conditioner for an electric car for a first embodiment according to the present invention. Air-conditioner unit 1 is an indoor unit mounted in the passenger compartment of the electric car. Air conditioner unit 1 has an air-conditioning duct 2 for introducing conditioned air into the passenger compartment. Air-conditioning duct 2 is equipped on its one end side with inlets 3, 4, 5 for drawing the inside and outside air. Inside-air inlet 4 and outside-air outlet 5 are opened/closed by inside/outside air changing door 6.

Adjacent to above inlets 3, 4 and 5, blower 7 is provided for blowing air into air-conditioning duct 2. Blower 7 is composed of a motor (not shown) and fans 7a, 7b driven by the motor.

At the other end of air-conditioning duct 2, plural air outlets are provided which communicate with the inside of the passenger compartment. The plural air outlets include foot outlet 8 for blowing the conditioned air toward the feet of the passenger, face outlet 9 for blowing the conditioned air toward the upper half of the passenger and defrost outlet 10 for blowing the conditioned air onto the inside of the vehicle windshield.

In air-conditioning duct 2, cooling evaporator 11 is disposed downstream of blower 7. Cooling evaporator 11 is an indoor heat exchanger composing a portion of refrigeration cycle 21, and operates as a cooler for dehumidifying and cooling the air within air-conditioning duct 2. This cooling is accomplished by using the endothermic action of the refrigerant flowing therein during cooling and dehumidifying modes described later.

In air-conditioning duct 2, heating condenser 12 is disposed downstream of cooling evaporator 11. Heating condenser 12 is an indoor heat exchanger composing a portion of refrigeration cycle 21, and operates as a heater for heating the air within air-conditioning duct 2 by heat-radiation of refrigerant flowing therein during heating and dehumidifying modes described later.

The air passage in air-conditioning duct 2 is divided by partition wall 13 into first air-passage 14 on the side of foot outlet 8 and second air-passage 15 on the side of face outlet 9 and defrost outlet 10. This division allows the performance of the following inside/outside air mode during the heating mode in winter. During the inside/outside air mode, heated inside-air is introduced into first air-passage 14 on the side of foot outlet 8 through inside-air inlet 3. This air is blown toward the feet of the passenger, thereby reducing the heating load. At the same time, in the inside/outside air mode, low-humidity outside-air is introduced into second air-passage 15 on the side of defrost outlet 10 through outside-air inlet 5, thereby preventing windshield fogging.

Doors 16, 17 are passage-changing doors for changing the passage between the air passage in condenser 12 and bypass passage 12a bypassing condenser 12. Door 17 also acts as a partition member of air passages 14, 15. Door 18 is disposed downstream of air passages 14, 15, and operates to either partition or allow communication between air passages 14, 15. Outlets 8, 9, 10 are respectively opened/closed by outlet-changing doors not shown.

Incidentally, the above refrigeration cycle 21 is a heat-pump-type refrigeration cycle for cooling, heating and dehumidifying the passenger compartment by cooling evaporator 11 and heating evaporator 12. Refrigeration cycle 21 further includes refrigerant compressor 22, refrigerant-refrigerant heat exchanger 23, outdoor heat-exchanger 24, and accumulator (gas-liquid separator) 25. In refrigerant-refrigerant heat exchanger 23, a gas and liquid intermediate-pressure refrigerant exchanges heat with a high-pressure refrigerant which is vaporized. Accumulator 25 separates the gas and liquid lower-pressure cycle refrigerant (refrigerant drawn into the compressor) and reserves surplus liquid refrigerant.

Refrigeration cycle 21 furthermore includes first depressurizing device 26, supercooling device 60, second depressurizing device 27, third depressurizing device 29, and solenoid valves (refrigerant-passage changing means) 28a, 28b, 28c. First depressurizing device 26 introduces a portion of higher-pressure refrigerant, having passed through condenser 12, and reduces the pressure thereof to an intermediate pressure. Supercooling device 60 supercools the higher-pressure refrigerant at the outlet of refrigerant-refrigerant heat exchanger 23. Second depressurizing device 27 reduces the pressure of the higher-pressure refrigerant having passed through this supercooling device 60 to the lower pressure during the heating mode. Third depressurizing device 29 reduces the pressure of the higher-pressure refrigerant having been condensed in outdoor heat-exchanger 24 to the lower pressure during the cooling mode. Solenoid valves 28a, 28b, 28c change the refrigerant passage in each of the cooling, heating, dehumidifying and defrosting modes.

Outdoor heat-exchanger 24 is disposed outside of the passenger compartment of the electric car to exchange heat with the outside air blown by outside fan 24. Aforementioned refrigerant-compressor 22 is an electric compressor with a not-shown AC motor integrally packaged in a sealed case, and is driven by the motor to draw, compress and discharge the refrigerant. AC voltage is applied to the AC motor of this refrigerant compressor 22 by inverter 30, and the frequency of the AC voltage is adjusted by this inverter 30, thereby continuously changing the revolution speed of the motor. That is, inverter 30 is a revolution-speed adjusting means for compressor 22, and DC voltage is applied thereto from battery 31 mounted on the vehicle. The power supplied to inverter 30 is controlled by air-conditioning controller 40.

Refrigerant compressor 20 is equipped with discharge port 22a, intake port 22b and injection port 22c. Discharge port 22a discharges the compressed refrigerant, intake port 22b draws the lower-pressure refrigerant of the cycle, and gas injection port 22c injects the intermediate-pressure gas refrigerant. This gas injection port 22c communicates with refrigerant-refrigerant heat exchanger 23 through gas-injection passage 22d.

Each of first and second depressurizing devices 26, 27 is made of an electric expansion valve (valuable throttle) where a valve opening is electrically adjusted. This electric expansion valve, for example, includes an electric driver such as a step motor. In such an electric expansion valve, the position of a valve element is adjusted by the electric driver, thereby adjusting the opening of a refrigerant-throttle passage. Third depressurizing device 29 uses a capillary tube as a fixed throttle in this embodiment. However, third depressurizing device 29 can use a valuable throttle such as an electric expansion valve.

First depressurizing device 26 is provided in bypass passage 63 connecting branch point 61a at the outlet of condenser 12 and gas-injection passage 22d. Solenoid valve 28b is provided for cooling in bypass passage 62 and directly connects the above-described branch point 61a and confluent point 61b.

Accumulator 25 includes U-shaped refrigerant-outlet tube 25a, and reserves surplus liquid-refrigerant on the bottom At side. U-shaped refrigerant-outlet tube 25a draws gas refrigerant from the upper-end opening thereof, thereby preventing the liquid refrigerant from returning to compressor 22. At the same time, the liquid refrigerant, in which oil dissolves, is drawn from the small-diameter oil-returning holes (not shown) provided at the bottom of U-shaped refrigerant-outlet tube 25a of accumulator 25. Then, the liquid refrigerant is mixed with the gas refrigerant, thereby ensuring the oil-returning performance of compressor 22.

In the cycle-refrigerant passage, supercooling device 60 is provided in higher-pressure refrigerant piping 32 connecting the outlet of higher-pressure passage 23a of refrigerant-refrigerant heat exchanger 23 and second depressurizing device 27. Supercooling device 60 is provided within air-conditioning duct 2 to improve the coefficient of performance during heating, and heats the air blown into the passenger compartment by heat radiation. In the present embodiment, supercooling device 60 is provided upstream of condenser 12 in second air passage 15, where outside air passes.

In higher-pressure refrigerant piping 32, described above, refrigerant-temperature sensor 41a and high-pressure sensor 41b are disposed for respectively detecting the temperature and pressure of higher-pressure refrigerant at the outlet of supercooling device 60. The output signals of these sensors 41a, 41b are input into air-conditioning controller 40 to control the opening of second depressurizing device 27, thereby controlling the supercool temperature of the higher-pressure refrigerant at the outlet of supercooling device 60.

In injection passage 22d, described above, intermediate-pressure-refrigerant temperature sensor 41f and intermediate-pressure sensor 41g are disposed which respectively detect the temperature and pressure of the intermediate-pressure refrigerant depressurized by first depressurizing device 26. The output signals of these sensors 41f, 41g are input into air-conditioning controller 40 to control the opening of first depressurizing device 26, thereby controlling the superheat temperature of the intermediate-pressure refrigerant at the outlet of the refrigerant-refrigerant heat exchanger.

Air-conditioning controller 40 is composed of a microcomputer and peripheral circuits, and the output signals of sensor group 41 are input thereinto. Sensor group 41 involves not only sensors 41a, 41b, 41f, 41g but also outside-temperature sensor 41c, evaporator-temperature sensor 41d, discharge-temperature sensor 41e, refrigerant-temperature sensor 41h, current sensor 41i and the like. Evaporator-temperature sensor 41d detects the temperature of air just passing through the evaporator. Discharge-temperature sensor 41e detects the temperature of gas refrigerant discharged from compressor 22. Refrigerant-temperature sensor 41h detects the temperature of the refrigerant at the outlet of outdoor heat-exchanger 24, and current sensor 41i detects the current of inverter 30.

Further, the signals respectively corresponding to each lever position, operated by the passenger (user) through air-conditioning control panel 50 (shown in FIG. 2), are input into air-conditioning controller 40.

In FIG. 1, only electrical connections between inverter 30 and air-conditioning controller 40 are shown. However, other electrical connections between other apparatuses and air-conditioning controller 40 also exist (although not shown). Air-conditioning controller 40 also controls first and second depressurizing devices 26, 27, solenoid valves 28a, 28b, doors 6, 16, 17, 18, outlet-changing doors (not shown), blower 7, outdoor fan 24a and the like. Solenoid valves 28a, 28b, are opened and closed, thereby changing the refrigerant-circulation route corresponding to each operation mode of the cooling, heating, dehumidifying and defrosting modes.

Figure 2:
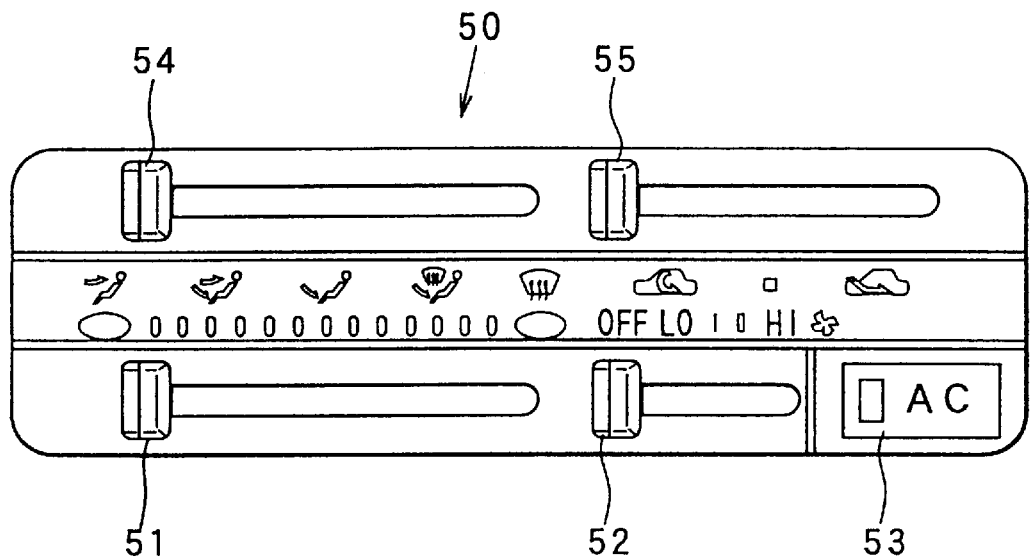
FIG. 2 is a front view of an air-conditioning panel of a heat-pump-type refrigeration-cycle device according to the present invention.

In air-conditioning control panel 50, shown in FIG. 2, the following switches are shown which are manually operated by the passenger. Temperature-control lever 51 sets the target temperature of the air blown into the passenger compartment, and sets the target rotation-speed of electric compressor 22 in the present embodiment.

Further, according to the target value set by the operation position of temperature-control lever 51, solenoid valves 28a, 28b and passage-changing doors 16, 17 are opened and closed, thereby changing the operation mode of the refrigeration cycle and controlling heat-exchange amount at condenser 12.

Figure 3:
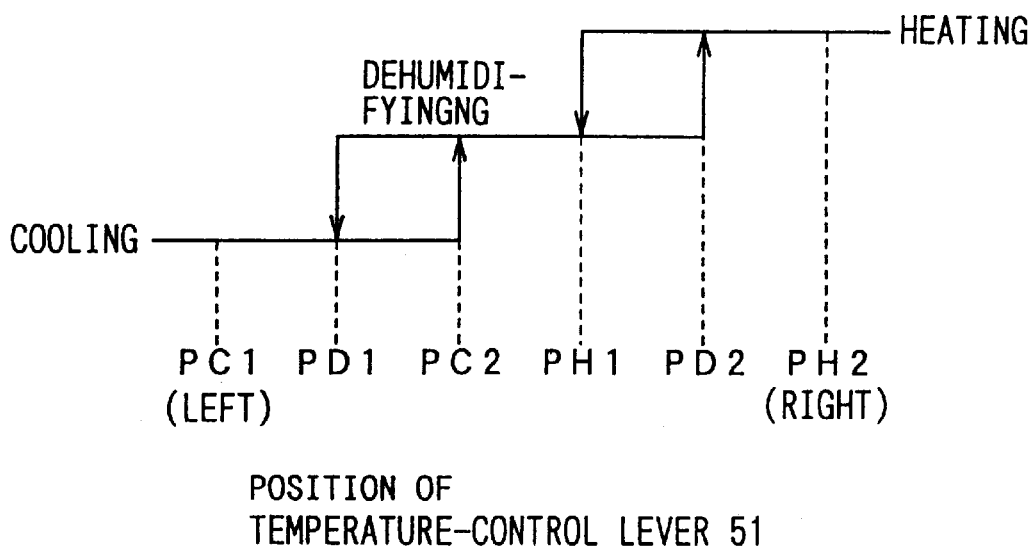
FIG. 3 is a diagram illustrating the operation region and the operation modes of a temperature-control lever in the air-conditioning panel in FIG. 2 of a heat-pump-type refrigeration-cycle device according to the present invention.
Figure 4:
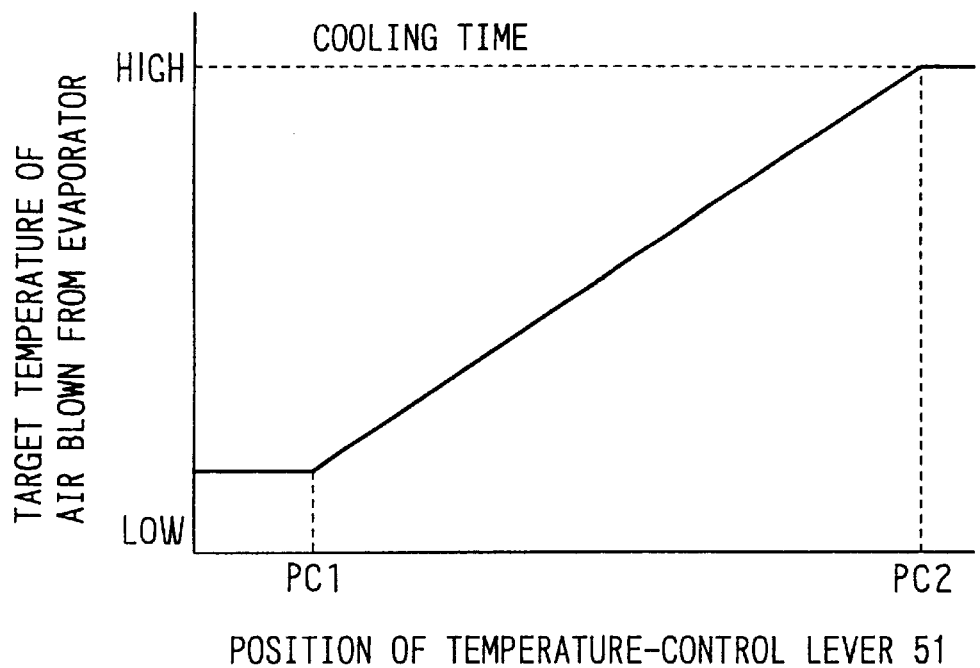
FIG. 4 is a diagram illustrating a cooling region of the temperature-control lever of FIG. 2 of a heat-pump-type refrigeration-cycle device according to the present invention.
Figure 5:
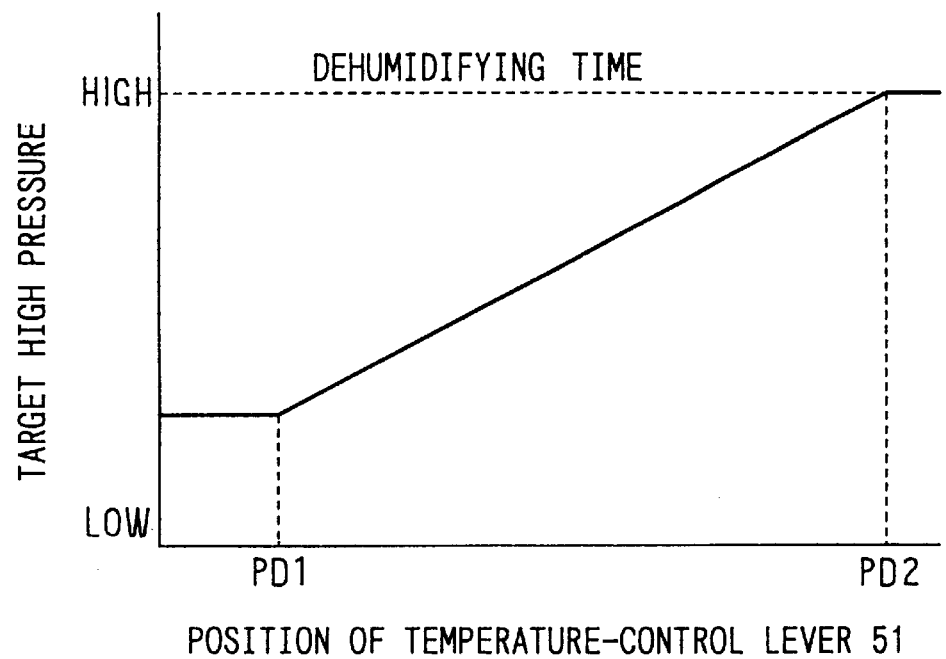
FIG. 5 is a diagram illustrating a dehumidifying region of the temperature-control lever of FIG. 2 of a heat-pump-type refrigeration-cycle device according to the present invention.
Figure 6:
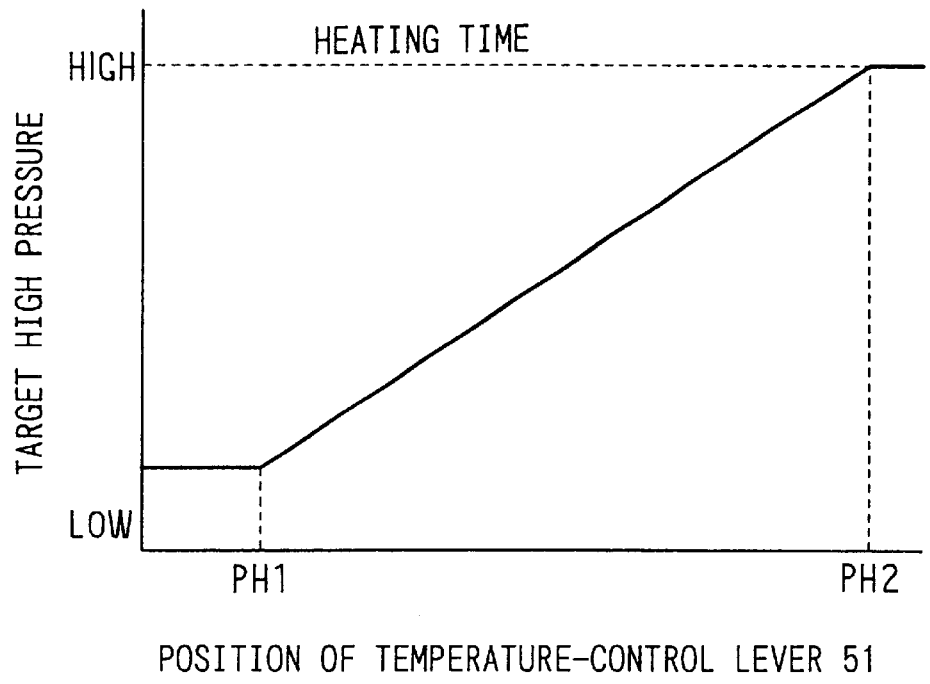
FIG. 6 is a diagram illustrating a heating region of the temperature-control lever of FIG. 2 of a heat-pump-type refrigeration-cycle device according to the present invention.

As shown in FIG. 3, as lever 51 is moved from left to right, the operation mode is sequentially changed from the cooling mode to the heating mode through the dehumidifying mode. As shown in FIGS. 4, 5, 6, by the operation position of temperature-control lever 51, the target temperature of the air blown from the evaporator is set during the cooling mode, and the target higher-pressure is set in the dehumidifying mode and the heating mode.

The signal representing the operation position (target value) of temperature-control lever 51 is input into controller 40. Then, controller 40 controls the rotation speed of compressor 22 so that the actual temperature of the air blown from the evaporator or the actual higher pressure detected by sensor group 41 conforms with the above target value, thereby controlling the blown-air temperature.

Changing lever 52 changes airflow speeds of blower 7. Likewise, air-conditioner switch 53 turns ON/OFF the compressor 22. Conditioned-air blow-mode changing lever 54 opens/closes changing doors (not shown) of outlets 8, 9, 10, and inside/outside air changing lever 55 opens/closes inside/outside air changing door 6.

Figure 7:
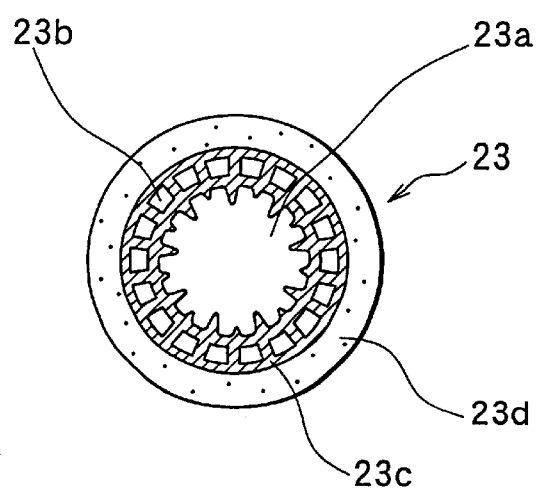
FIG. 7 is a cross-sectional view of a refrigerant-refrigerant heat exchanger of a heat-pump-type refrigeration-cycle device according to the present invention.

In refrigerant-refrigerant heat exchanger 23, described above, for example, as shown in FIG. 7, higher-pressure passage 23a and intermediate-pressure passage 23b located outside of this higher-pressure passage 23a are formed concentrically as a cylindrical double-passage structure. In FIG. 1, a main refrigerant (higher-pressure refrigerant) flows in higher-pressure passage 23a from branch point 61a to supercooling device 60.

Intermediate-pressure passage 23b is composed of plural small passages disposed circumferentially around higher-pressure passage 23a. A portion, divided from the refrigerant at branch point 61a, flows into bypass passage 63, and is depressurized by first depressurizing device 26 to the intermediate pressure. This intermediate-pressure refrigerant flows into intermediate-pressure passage 23b. The refrigerant having passed through intermediate-pressure passage 23b passes through injection passage 22d, and is introduced into injection port 22c.

Tubular member 23c, encasing higher-pressure passage 23a and intermediate-pressure passage 23b, is molded (for example, extruded) from high thermal-conduction metal such as aluminum. Heat-insulating material is attached to the peripheral surface of tubular member 23c. Therefore, heat exchange can be satisfactorily performed only between the higher-pressure refrigerant within higher-pressure passage 23a and the intermediate-pressure refrigerant within intermediate-pressure passage 23b.

When gas injection is not required, first depressurizing device 26 is entirely closed, so that the higher-pressure refrigerant flows only in higher-pressure passage 23a. Accordingly, refrigerant-refrigerant heat exchanger 23 is used as a portion of higher-pressure refrigerant piping 32.

Next, the operation of the first embodiment of the present invention will be explained. If air conditioner switch 53 is turned on, its signal is input into controller 40 and controller 40 turns compressor 22 on. When temperature-control lever 51 is positioned between PH1 and PH2 during this state, controller 40 determines that the heating mode is set, and controls equipment such as solenoid valves 28a, 28b, 28c and passage-changing doors 16, 17 in the state of the heating operation shown in FIG. 8.

The refrigerant flow during the heating mode will be explained with the cycle shown in FIG. 1. In FIG. 1, black arrows indicate the refrigerant flow during the heating mode. The superheated gas-refrigerant, having higher temperature and pressure discharged from compressor 22, flows into indoor condenser 12, and exchanges heat with (radiates heat to) the air blown by blower 7 which is condensed. The hot air heated by the gas-refrigerant condensation is blown into the passenger compartment mainly from foot outlet 8, thereby heating the passenger compartment.

Since solenoid-valve 28b is closed during heating, one portion of the higher-pressure two-phase refrigerant exiting condenser 12 flows into bypass passage 63, and flows into first depressurizing device 26 to be depressurized to intermediate pressure PM. The two-phase refrigerant, depressurized to intermediate pressure PM, flows into intermediate-pressure passage 23b. Then, the intermediate-pressure refrigerant exchanges heat with (extracts heat from) the higher-pressure refrigerant at the outlet of condenser 12 flowing into higher-pressure passage 23a, thereby being vaporized and flowing into injection port 22c.

When the other portion (main flow) of the higher-pressure refrigerant exiting condenser 12 flows through higher-pressure passage 23a of refrigerant-refrigerant heat exchanger 23, the other portion exchanges heat with (radiates heat to) the intermediate-pressure refrigerant which is supercooled. The supercooled higher-pressure refrigerant flows into supercooling device 60, and is again supercooled therein.

Since supercooling device 60 is disposed upstream of condenser 12 within second air passage 15, the wintertime lower-temperature outside air introduced into air-conditioning duct 2 flows directly into supercooling device 60. Therefore, in supercooling device 60, higher-pressure refrigerant, supercooled in refrigerant-refrigerant heat exchanger 23, is again supercooled.

Specifically, during the heating mode, the refrigerant at the inlet of supercooling device 60 has roughly a pressure range of 8 to 15 kg f/cm$^2$, a temperature range of 15 to 45° C. (the supercool temperature corresponding to the foregoing pressure range is a temperature range 10 to 20° C.). Therefore, the refrigerant can exchange heat with the lower-temperature outside air in winter (for example, the outside air having the temperature of 0° C. or lower), thereby being again supercooled.

The higher-pressure refrigerant, having passed through supercooling device 60, flows into second depressurizing device 27. Then, the refrigerant is depressurized by second depressurizing device 27 to lower pressure PL and flows into outdoor heat-exchanger 24. When the lower-pressure refrigerant passes through outdoor heat-exchanger 24, the refrigerant extracts heat from the air (outside air) blown by outdoor fan 24a and is vaporized.

The gas refrigerant, vaporized in outdoor heat-exchanger 24, flows into accumulator 25 through solenoid valve 28a. Liquid refrigerant, generated due to heating-load fluctuation, is reserved within accumulator 25. In accumulator 25, gas refrigerant is drawn from the upper-end opening of U-shaped refrigerant-outlet tube 25a. Meanwhile, the liquid refrigerant, in which oil dissolves, is drawn from the oil-returning holes (not shown) provided on the bottom of U-shaped refrigerant-outlet tube 25a. Then, the liquid refrigerant is mixed with the gas refrigerant, and the gas refrigerant is drawn into intake port 22b of compressor 22. Accordingly, even when refrigerant-flow volume is small, such as during a lower-load heating between starting and stopping a vehicle during the heating mode, oil is returned to compressor 22.

Figure 9:
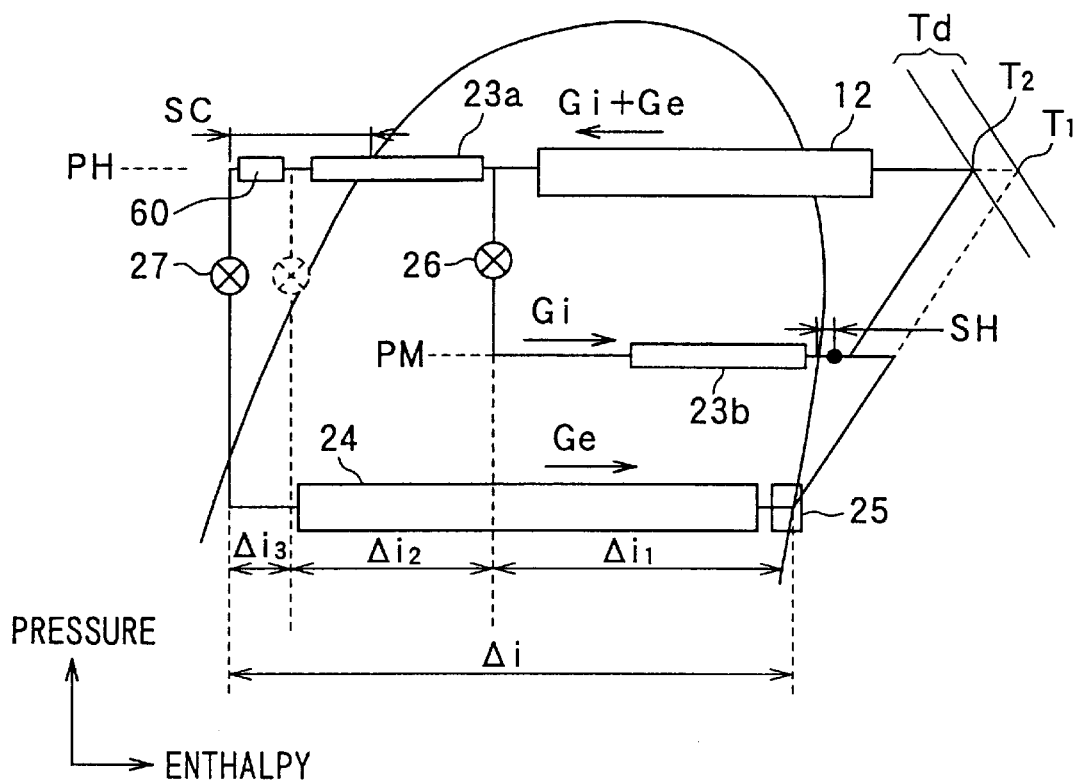
FIG. 9 is a Mollier diagram illustrating the operation of a refrigeration cycle in a heating mode of a heat-pump-type refrigeration-cycle device according to the present invention.

FIG. 9 is a Mollier diagram showing the refrigerant state of the refrigeration cycle during a heating operation. The opening of first depressurizing device 26 (electric expansion valve) is controlled by controller 40 based on signals detected by intermediate-pressure-refrigerant temperature sensor 41f and intermediate-pressure sensor 41g. As a result, refrigerant flow volume is controlled so that superheat temperature SH of gas-injection refrigerant to flow into injection port 22c of compressor 22 reaches a predetermined value.

That is, if superheat temperature of the gas-injection refrigerant increases, the opening of first depressurizing device (electric expansion valve) 26 is increased. Conversely, if superheat temperature SH decreases, the opening of first depressurizing device (electric expansion valve) 26 is decreased.

The opening of second depressurizing device 27 is controlled by controller 40. As a result, the amount of heat-exchange between refrigerant-refrigerant heat exchanger 23 and supercooling device 60 is controlled so that supercool temperature SC of the higher-pressure refrigerant exiting supercooling device 60 reaches a predetermined value. That is, if supercool temperature SC of the higher-pressure refrigerant increases, the opening of second depressurizing device 27 is increased, thereby decreasing the higher-pressure value and supercool temperature SC. Conversely, if supercool temperature SC of the higher-pressure refrigerant decreases, the opening of second depressurizing device 27 is decreased, thereby increasing the higher-pressure value and supercool temperature SC.

In FIG. 9, Gi is the flow volume of the refrigerant gas-injected into injection port 22c from gas-injection passage 22d, and Ge is the flow volume of the refrigerant drawn into compressor 22 through outdoor heat-exchanger 24 (evaporator during heating). $\Delta i1$ is the enthalpy difference of the intermediate-pressure refrigerant gas-injected which extracts heat in refrigerant-refrigerant heat exchanger 23. $\Delta i2$ is the enthalpy difference of the higher-pressure refrigerant which radiates heat in refrigerant-refrigerant heat exchanger 23 and heads for second depressurizing device 27. $\Delta i3$ is the enthalpy difference of the higher-pressure refrigerant which radiates heat in supercooling device 60 and heads for second depressurizing device 27. $\Delta i$ is the amount of heat-extraction in outdoor heat-exchanger (evaporator during heating) 24, and is calculated on the basis of the following formula.

$$\Delta i = \Delta i1 + \Delta i2 + \Delta i3$$

Passage-changing doors 16, 17 open the air passage on the side of condenser 12 and entirely close bypass passage 12a. Therefore, heat exchange is performed at both condenser 12 and supercooling device 60 between the higher-pressure refrigerant discharged from compressor 22 and the air blown by blower 7.

Next, the heating-performance improvement according to the present embodiment will be described. In the conventional heat-pump system not having gas-injection, when outside temperature decreases during heating, inlet pressure is decreased, so that refrigerant specific volume is increased, thereby decreasing refrigerant-cycle volume G1 drawn by compressor 22 and reducing heating performance. Since the compression ratio is enlarged due to inlet-pressure reduction, discharge-refrigerant temperature Td of compressor 22 increases up to point T1 in FIG. 9. Therefore, the compressor cannot be operated at maximum performance (maximum revolution speed).

In the present embodiment, however, a portion of the refrigerant at the outlet of indoor condenser 12 is depressurized, and exchanges heat in refrigerant-refrigerant heat exchanger 23 and is vaporized. Then, the gas refrigerant is returned to compressor 22 (gas-injection) through gas-injection passage 22d. Therefore, refrigerant volume Gi which is gas-injected is added to refrigerant-cycle volume Ge which is drawn into compressor 22. The resulting compression work is the summation thereof. According to this, the amount of compression-work is increased, and the amount of refrigerant-heat-radiation is increased in condenser 12, thereby improving heating performance.

At the same time, since the intermediate-pressure gas refrigerant is injected halfway during the compression step of compressor 22, the gas refrigerant halfway compressed and heated is cooled with the intermediate-pressure refrigerant, so that discharge-refrigerant temperature Td decreases from point T1 to point T2 in FIG. 9. Therefore, compressor 22 can be operated at maximum performance (maximum revolution speed).

Further, according to the present embodiment, the higher-pressure refrigerant at the outlet of condenser 12 is supercooled in refrigerant-refrigerant heat exchanger 23 and supercooling device 60 during two steps. Therefore, the amount of heat-extraction ($\Delta i$) in outdoor heat-exchanger (evaporator during heating) 24 is increased to be ($\Delta i1 + \Delta i2 + \Delta i3$), and the air heated by supercooling device 60 is blown to the passenger compartment, thereby improving not only heating performance but also the coefficient of performance (COP).

In the present embodiment, since supercooling device 60 is disposed upstream of condenser 12 within outside-air passage 15, heat exchange can be performed in supercooling device 60 directly with the lower-temperature outside air. Therefore, even when the pressure and temperature of the refrigerant at the inlet of supercooling device 60 are lower due to the fluctuation of cycle-operation conditions, a temperature difference exists between refrigerant at the inlet of supercooling device 60 and lower-temperature outside air. This provides for sufficient supercooling of the higher-pressure refrigerant in supercooling device 60.

Accordingly, the supercool temperature of the higher-pressure refrigerant is larger at all times, and amount of heat-extraction $\Delta i$ in outdoor heat-exchanger 24 is larger, thereby effectively improving the coefficient of performance (COP).

When temperature-control lever 51 is positioned between PC1 and PC2 in FIG. 3, controller 40 determines that the cooling mode is set, and controls solenoid valves 28a, 28b and passage-changing doors 16, 17 for the cooling mode shown in FIG. 8. In FIG. 1, white arrows indicate refrigerant flows during the cooling mode. Moreover, during this mode, valve 211A is closed.

White arrows in FIG. 1 indicate the refrigerant-flow directions during the cooling mode. During the cooling mode, since passage-changing doors 16, 17 seal the air passage on the side of condenser 12 (supercooling device 60), all of the air blown by blower 7 flows into bypass passage 12a. Therefore, even if the superheated gas-refrigerant having higher pressure and temperature, discharged from compressor 22, flows into condenser 12, the gas refrigerant does not exchange heat with the air blown by blower 7. As a result, the gas refrigerant discharged from compressor 22 reaches branch point 61a under the superheated state having higher temperature and pressure. Since first and second depressurizing devices (electric expansion valves) 26, 27, and 211A are controlled to be entirely closed and solenoid valve 28b is open during cooling, the gas refrigerant discharged from compressor 22 flows from branch point 61a into outdoor heat-exchanger 24 through bypass passage 62.

At outdoor heat-exchanger 24, the higher-pressure refrigerant exchanges heat with (radiates heat to) the air (outside air) blown by outdoor fan 24a and is condensed. The refrigerant condensed in outdoor heat-exchanger 24 is depressurized to lower pressure PL in third depressurizing device 29. Since solenoid valve 28a is closed, the refrigerant passes through third depressurizing device 29. Thereafter, the refrigerant flows into evaporator 11.

In evaporator 11, the refrigerant extracts heat from the air blown by blower 7 and is vaporized. As described above, the air cooled in evaporator 11 does not pass through indoor condenser 12 on the downstream side, but passes through bypass passage 12a as cool air. Then, the cool air is blown into the passenger compartment mainly from face outlet 9, thereby cooling the passenger compartment. The gas refrigerant vaporized in evaporator 11 flows into accumulator 25, and is drawn into intake port 22b of compressor 22 from accumulator 25.

When temperature-control lever 51 is positioned between PD1 and PD2, controller 40 determines that the dehumidifying mode is set, and controls solenoid valves 28a, 28b and passage-changing doors 16, 17 to the dehumidifying mode shown in FIG. 8.

In FIG. 1, cross-hatched arrows indicate refrigerant flows in the dehumidifying mode. In this mode, since the air passage on the side of condenser 12 is opened by passage-changing doors 16, 17, the superheated gas refrigerant having higher temperature and pressure, discharged from compressor 22, flows into condenser 12. In condenser 12, the gas refrigerant exchanges heat with (radiates heat to) the air blown by blower 7 and is condensed. Since first depressurizing device (electric expansion valve) 26 is entirely closed in bypass passage 63, the refrigerant does not flow into intermediate-pressure passage 23b of refrigerant-refrigerant heat exchanger 23. At this time, since solenoid valve 28b is closed during cooling, all of the higher-pressure refrigerant condensed in condenser 12 passes through higher-pressure passage 23a of refrigerant-refrigerant heat exchanger 23. The higher-pressure refrigerant passes through supercooling device 60, and flows into second depressurizing device 27. The higher-pressure refrigerant is depressurized to the intermediate pressure by second depressurizing device 27, and flows into outdoor heat-exchanger 24.

In the dehumidifying mode, first dehumidifying mode D1 requires blown air having higher temperature. In first dehumidifying mode D1, the intermediate pressure provided by second depressurizing device 27 is set at a value lower than the saturated vapor-pressure of the refrigerant at outside-air temperature. As a result, the outdoor heat-exchanger 24 operates as an evaporator so that the refrigerant therein extracts heat from the surroundings. That is, the amount of depressurization is increased by making the opening of second depressurizing device 27 smaller, to depressurize to a lower pressure.

The intermediate-pressure refrigerant exiting outdoor heat-exchanger 24 flows into third depressurizing device 29 by closing solenoid valve 28a, and is depressurized to lower pressure PL. The depressurized lower-pressure refrigerant flows into evaporator 11 to extract heat from the air blown by blower 7, and then flows into accumulator 25. Gas refrigerant from accumulator 25 is drawn into intake port 22b of compressor 22 from accumulator 25.

In the dehumidifying mode, since the refrigerant flows into evaporator 11, supercooling device 60 and condenser 12 the air blown by blower 7 is heated in supercooling device 60 and condenser 12 and is cooled and dehumidified in evaporator 11. The resulting hot air is blown into the passenger compartment, thereby defogging the windshield and dehumidifying/heating the passenger compartment.

In first dehumidifying mode D1, the amount of heat-radiated by indoor condenser 12 is the summation of the motive-power amount of compressor 22 and the amount of heat-extraction by outdoor heat-exchanger 24 and indoor evaporator 11. Therefore, high temperature blown air is provided. Second dehumidifying mode D2 requires blown air having a lower temperature. In second dehumidifying mode D2, the intermediate pressure provided by second depressurizing device 27 is set at a value higher than the saturated vapor-pressure of the refrigerant at outside-air temperature, so that outdoor heat-exchanger 24 operates as a condenser. As a result, the refrigerant radiates heat therefrom. That is, the amount of depressurization is reduced by making the opening of second depressurizing device 27 larger, so that the intermediatepressure is set at higher pressure.

Accordingly, outdoor heat-exchanger 24 operates as a condenser so that refrigerant radiates heat therefrom. Therefore, the summation of the motive-power from compressor 22 and the amount of heat-extraction of indoor evaporator 11 is equalized to the summation of the amount of heat-radiation of outdoor heat-exchanger 24, indoor condenser 12 and supercooling device 60. Accordingly, the summation of the amount of heat-radiation of indoor condenser 12 and supercooling device 60 is reduced lower than in first dehumidifying mode D1, thereby providing blown air having a lower temperature.

In the present embodiment, refrigerant-cycle routes can be simplified for the following reason. During the cooling mode, since the air stream into condenser 12 is bypassed with passage-changing doors 16, 17 to flow through bypass passage 12a, condenser 12 operates as a portion of the higher-pressure refrigerant passage. Therefore, in all of the heating, cooling, dehumidifying and defrosting modes, since the refrigerant flows through condenser 12 without heat exchange, the gas refrigerant discharged from compressor 22 can at all times flow into outdoor heat-exchanger 24 through condenser 12 in one direction. As a result, a four-way valve for reversing the refrigerant-flow direction can be removed, or the number of valves such as check valves for changing the refrigerant-flow route and solenoid valves can be reduced, thereby simplifying the refrigerant-piping structure.

Figure 10:
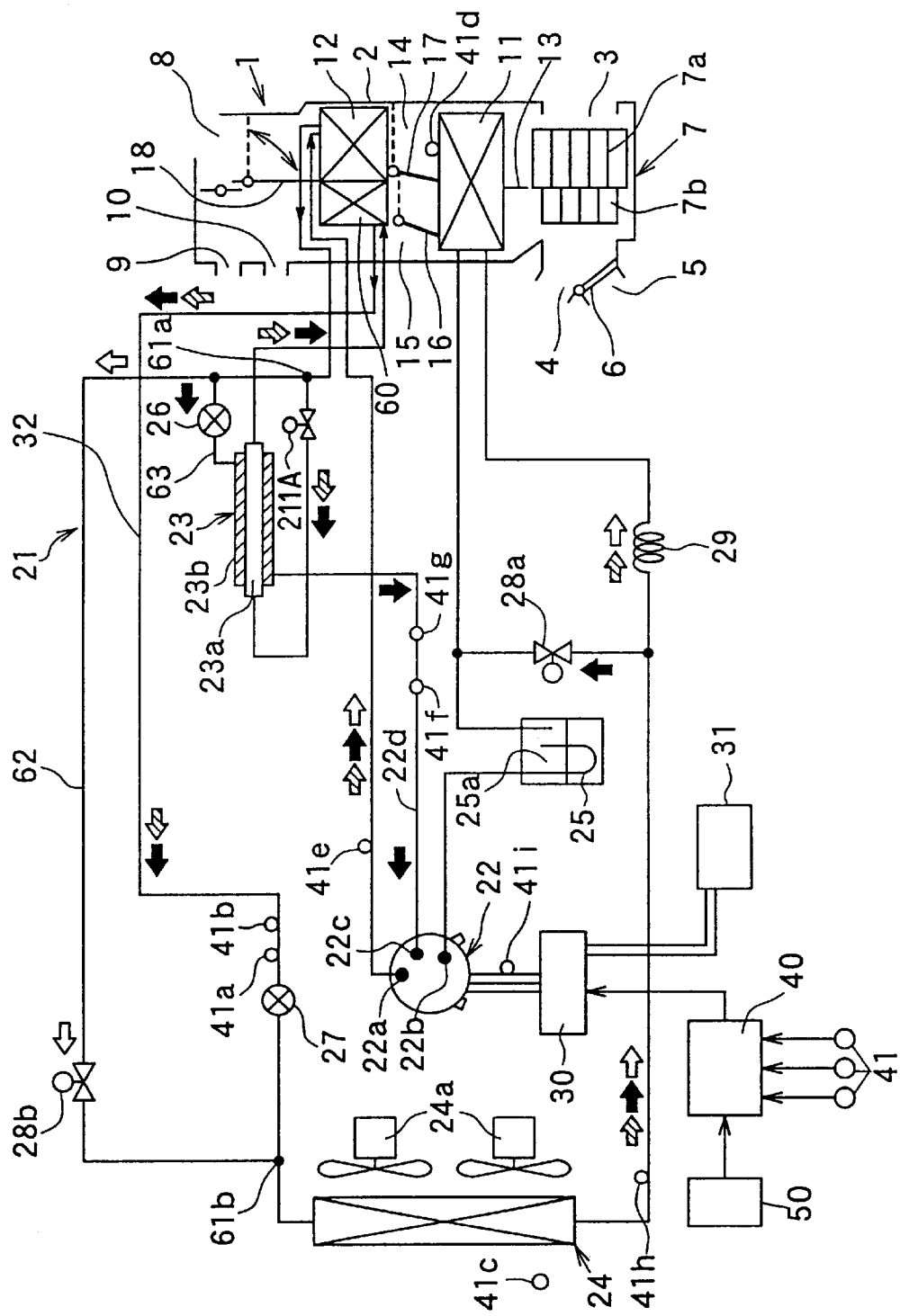
FIG. 10 is a refrigeration-cycle diagram of a heat-pump-type refrigeration-cycle device according to the present invention.
Figure 11:
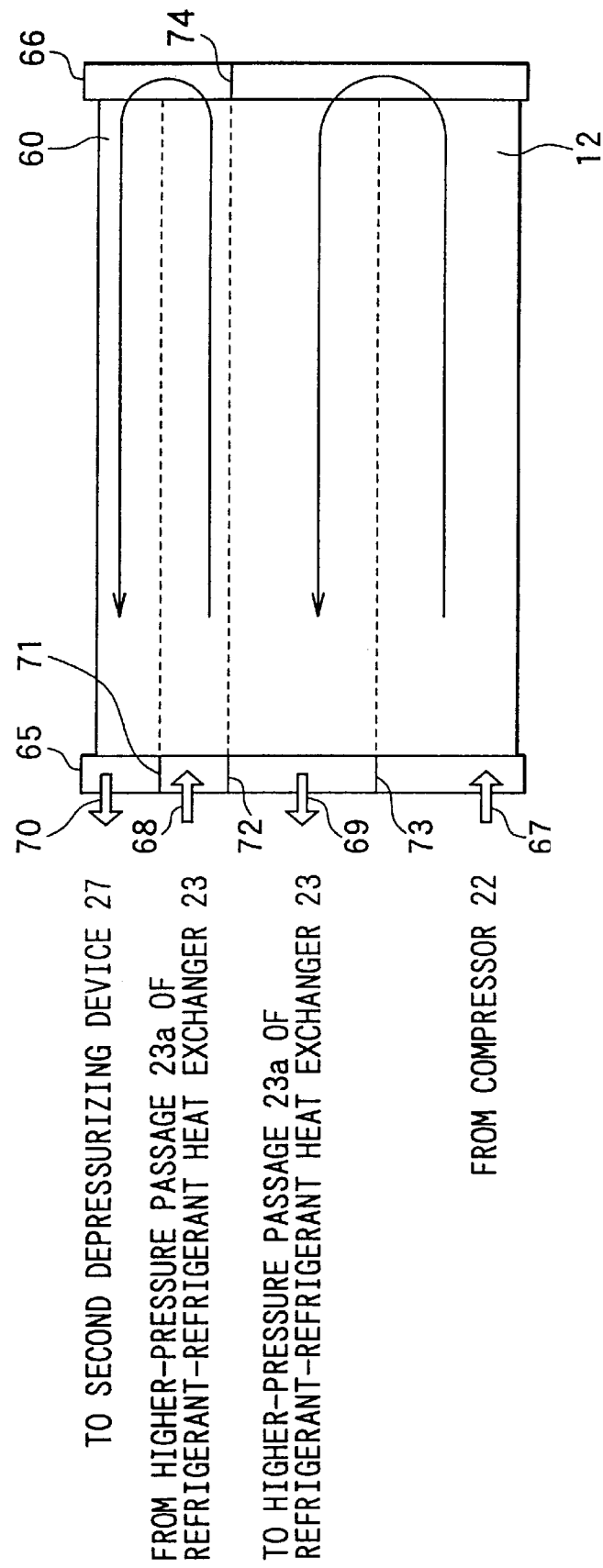
FIG. 11 is a cross-sectional front view of a heat exchanger of a heat-pump-type refrigeration-cycle device according to the present invention.

FIGS. 10, 11 show a second embodiment of the present invention. Here, in condenser 12, an outside-air core portion is located within outside-air passage 15 and is composed as supercooling device 60. In the second embodiment, an integrated heat-exchanger includes an inside-air core portion, operating as condenser 12, located within inside-air passage 14. The integrated heat exchanger 12 also includes an outside-air core portion, operating as supercooling device 60, located within outside-air passage 15.

Figure 13:
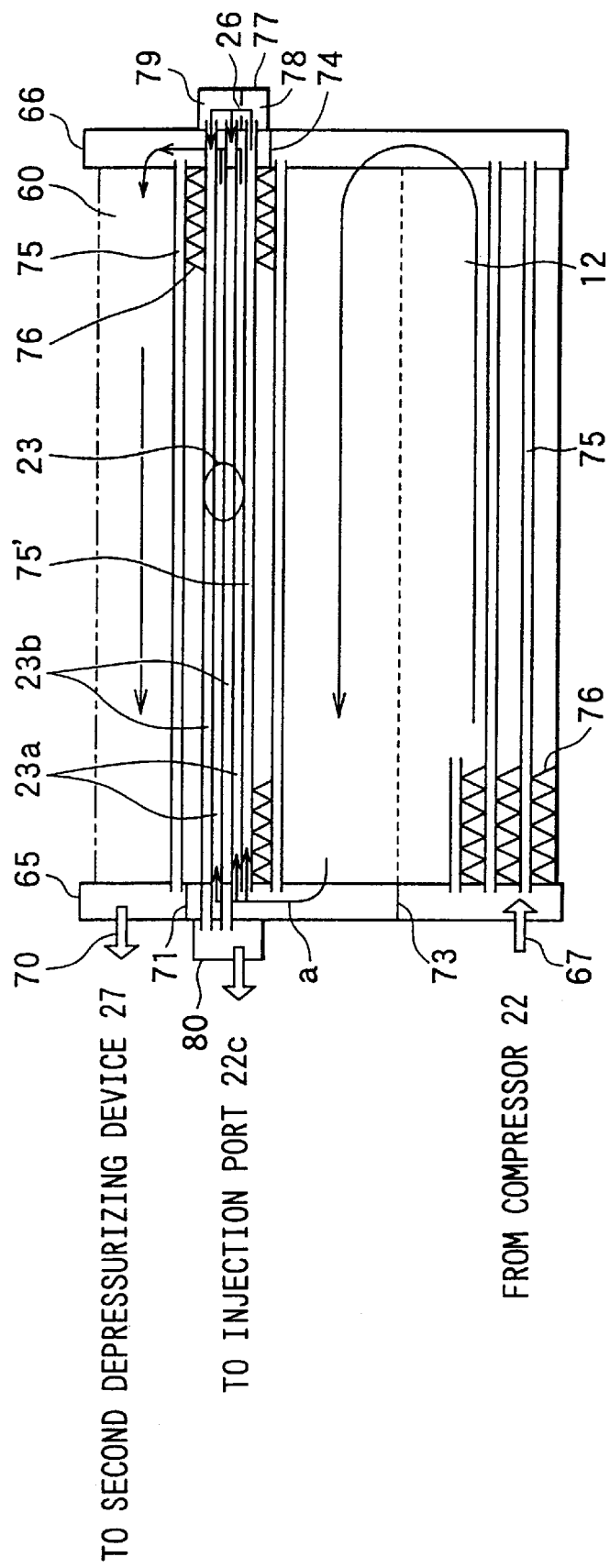
FIG. 13 is a cross-sectional front view showing a heat exchanger of a heat-pump-type refrigeration-cycle device according to the present invention.

FIG. 11 illustrates the heat exchanger formed of integrating condenser 12 and supercooling device 60 according to the second embodiment. Condenser 12 and supercooling device 60 include header tanks 65, 66 on the right and left ends of a core portion, respectively. The core portion is composed of flat tubes and corrugate fins as shown in FIG. 13 described later. Header tank 65 distributes refrigerant into the plural flat tubes, and header tank 66 collects the refrigerant therefrom.

In header tank 65, refrigerant inlets 67, 68 and refrigerant outlets 69, 70 of condenser 12 and supercooling device 60 are provided, respectively. In header tanks 65, 66, partition plates 71–74 partition inside spaces in a longitudinal direction. Accordingly, the refrigerant flows within each portion of the core of condenser 12 and supercooling device 60, having U-shaped turns as indicated by an arrow in the drawing.

Figure 12:
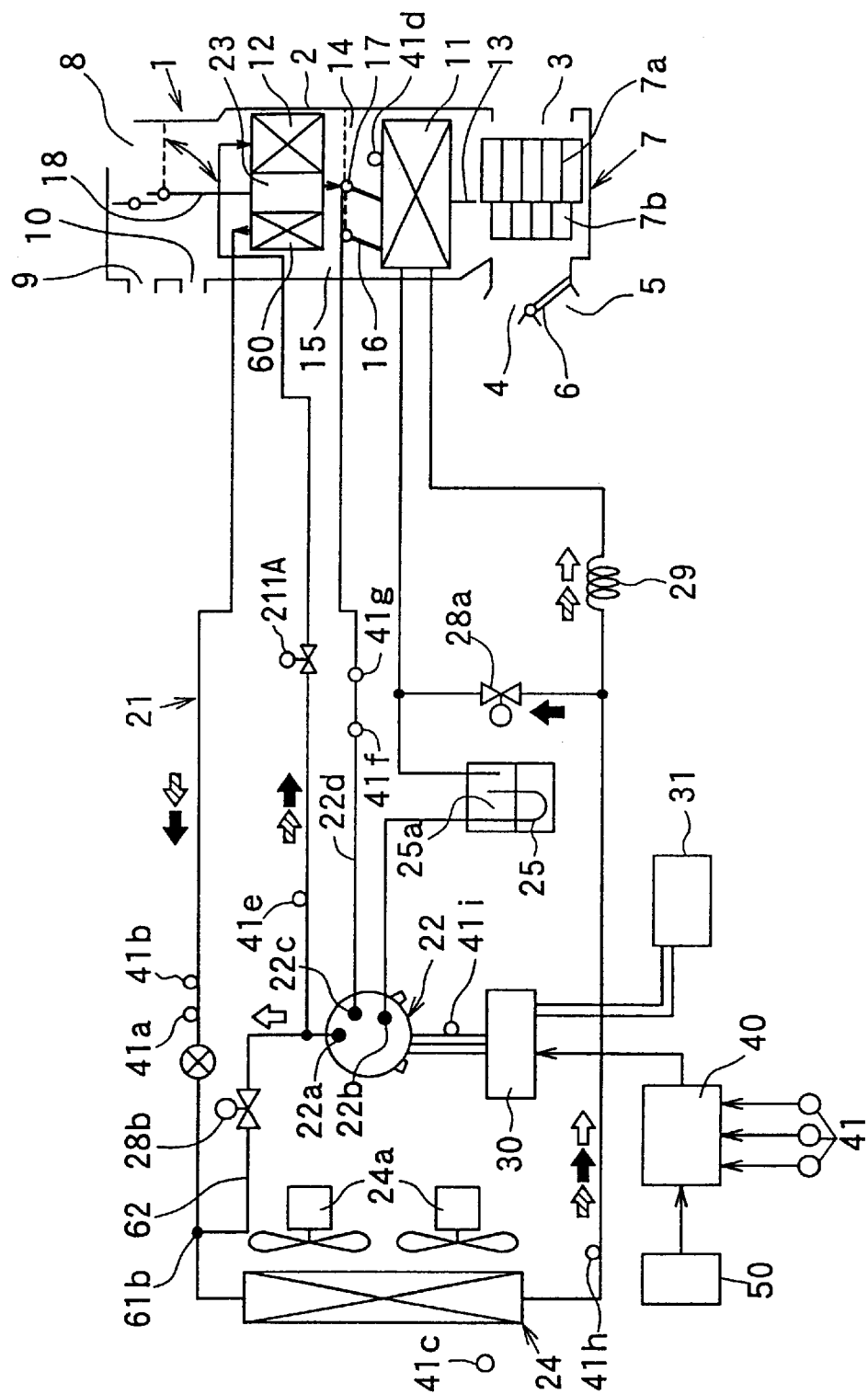
FIG. 12 is a refrigeration-cycle diagram of a heat-pump-type refrigeration-cycle device according to the present invention.

FIGS. 12, 13 show a third embodiment of the present invention. In the third embodiment, refrigerant-refrigerant heat exchanger 23 and first depressurizing device 26 are integrated into the integrated heat exchanger according to the second embodiment. Here, refrigerant-refrigerant heat exchanger 23 is disposed between condenser 12 and supercooling device 60. Condenser 12 is disposed within inside-air passage 14, and supercooling device 60 is disposed within outside-air passage 15. A shield member (not shown) is disposed on refrigerant-refrigerant heat exchanger 23 to shield it from the air stream within air-conditioning duct 2.

In FIG. 13, the core portion of condenser 12 and supercooling device 60 are composed of flat tubes 75 and corrugate fins 76. Refrigerant-refrigerant heat exchanger 23 is composed by alternately laminating a flat tube composing higher-pressure passage 23a and a flat tube composing intermediate-pressure passage 23b.

The higher-pressure refrigerant which flowed through the core portion of condenser 12 is divided into higher-pressure passage 23a of refrigerant-refrigerant heat exchanger 23 and uppermost flat-tube 75' of the core portion of condenser 12. In right header tank 66 in FIG. 13, auxiliary header tank 77 is provided and is partitioned to be higher-pressure chamber 78 and intermediate-pressure chamber 79. At the partition portion between higher-pressure chamber 78 and intermediate-pressure chamber 79, first depressurizing device 26 composed of a fixed throttle (orifice) is provided.

Therefore, the higher-pressure refrigerant, having flowed into higher-pressure chamber 78 from flat tube 75', is depressurized by first depressurizing device 26 to the intermediate pressure and then flows into intermediate-pressure chamber 79. The intermediate-pressure refrigerant exchanges heat with the higher-pressure refrigerant within higher-pressure passage 23a and is vaporized while passing through intermediate-pressure passage 23b of refrigerant-refrigerant heat exchanger 23. The intermediate-pressure refrigerant, vaporized within intermediate-pressure passage 23b, flows out of auxiliary header tank 80 and travels toward injection port 22c.

In the third embodiment, as shown in FIG. 12, bypass passage 62, where solenoid valve 28b is disposed, is provided between discharge port 22a of compressor 22 and confluent point 61b on the inlet side of outdoor heat exchanger 24. Accordingly, by opening solenoid valve 28b during the cooling mode, the gas refrigerant discharged from compressor 22 can directly flow into outdoor heat-exchanger 24 through bypass passage 62. Therefore, even if higher-pressure passage 23a of refrigerant-refrigerant heat exchanger 23 is composed of the flat tubes where pressure loss is larger, the higher-pressure refrigerant does not flow through this higher-pressure passage 23a during the cooling mode, thereby reducing pressure loss and improving cooling performance.

Figure 14:
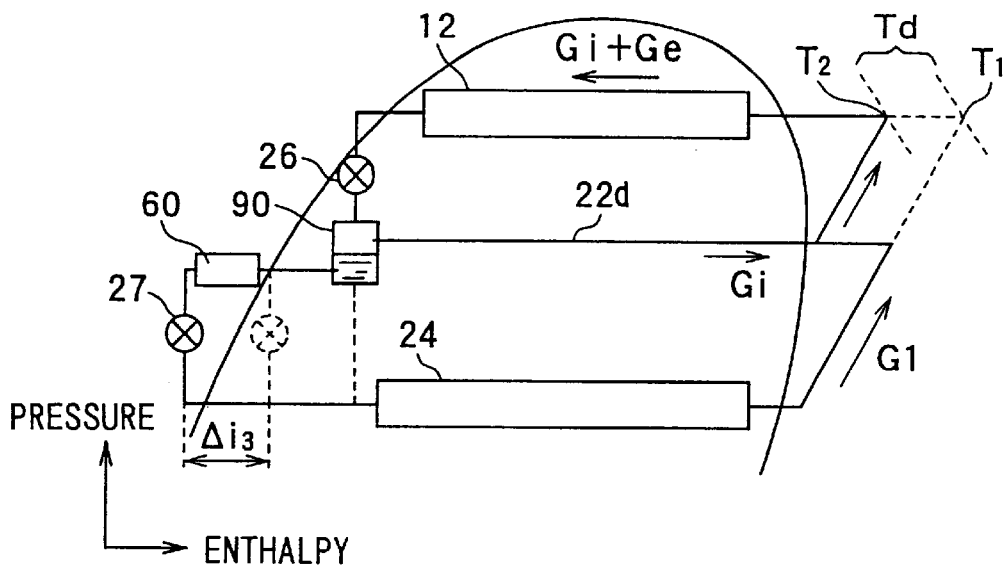
FIG. 14 is a Mollier diagram illustrating refrigeration-cycle operation of a heat-pump-type refrigeration-cycle device according to the present invention.
Figure 15:
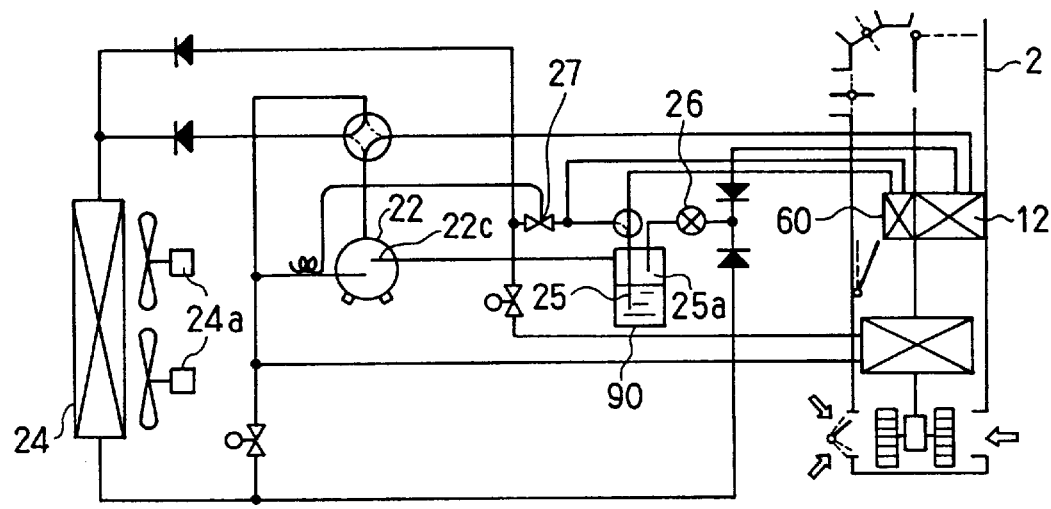
FIG. 15 is a refrigeration cycle diagram of a heat-pump-type refrigeration-cycle device according to the present invention.

FIG. 14 is a Mollier diagram for the heating mode according to a fourth embodiment of the present invention, and FIG. 15 is a refrigeration cycle diagram of the device depicted in FIG. 14. In the fourth embodiment, gas-injection during the heating mode is different from the first to third embodiments. In the fourth embodiment, the higher-pressure refrigerant having gas and liquid phases, condensed within condenser 12 during the heating mode, is depressurized by first depressurizing device 26 to intermediate pressure. Then, the intermediate-pressure refrigerant is introduced into gas-liquid separator 90 and is separated into the intermediate saturated vapor-pressure gas-refrigerant and the intermediate saturated vapor-pressure liquid-refrigerant.

The intermediate saturated vapor-pressure gas-refrigerant is introduced halfway during the compression step of compressor 22 through injection port 22c. The intermediate saturated vapor-pressure liquid-refrigerant is introduced into supercooling device 60, disposed within air-conditioning duct 2, for supercooling as in the first to third embodiments.

In the fourth embodiment, since the intermediate saturated vapor-pressure liquid-refrigerant is introduced into supercooling device 60, the refrigerant on the inlet of supercooling device 60 has roughly a pressure range of 3 to 8 kg f/cm$^2$, a temperature range of 8 to 35° C. (a saturated-vapor-temperature range corresponding to the foregoing pressure range). Therefore, both the temperature and pressure of the refrigerant is reduced lower than those in the first to third embodiments. However, the intermediate saturated vapor-pressure liquid-refrigerant can exchange heat with the lower-temperature outside air in winter (for example, the outside air having the temperature of 0° C. or lower), thereby being supercooled sufficiently.

The supercooled intermediate-pressure refrigerant is depressurized by second depressurizing device 27 to the lower pressure, and is introduced into outdoor heat-exchanger (evaporator during the heating mode) 24 and vaporized.

In the fourth embodiment as well, during the heating mode, since the amount of heat-extraction in outdoor heat-exchanger 24 can be increased by the amount of supercooling (enthalpy difference $\Delta i3$) performed by supercooling device 60, the coefficient of performance (COP) can be improved.

JP-A-9-39550 discloses that the intermediate saturated vapor-pressure gas-refrigerant, as is separated in gas-liquid separator 90, is introduced halfway during the compression step of compressor 22 through gas-injection port 22c, thereby omitting detailed explanation about all the refrigeration cycle according to the fourth embodiment. JP-A-9-39550 is hereby incorporated by reference.

Supercooling device 60 is preferably disposed upstream of condenser 12 within outside-air passage 15 in air-conditioning duct 2 for decreasing the supercool temperature. However, in some heating condition, even when supercooling device 60 is disposed downstream of condenser 12 within outside-air passage 15 in air-conditioning duct 2, the higher-pressure refrigerant or the intermediate-pressure refrigerant can be supercooled by supercooling device 60.

Similarly, during some heating conditions, even when supercooling device 60 is disposed downstream of condenser 12 within inside-air passage 14, the higher-pressure refrigerant or the intermediate-pressure refrigerant can be supercooled by supercooling device 60.

In the operation explanation about the first embodiment, during the heating mode, first depressurizing device 26 is at all times opened at the prescribed opening, and the gas refrigerant is injected to compressor 22. However, first heating mode Hi for increasing the temperature of the air blown into the passenger compartment and second heating mode H2 for decreasing the temperature thereof are set. In first heating mode H1, first depressurizing device 26 can be opened. In second heating mode H2, first depressurizing device can be closed and gas-injection into compressor 22 can be stopped.

In above embodiments, two plate-type passage-changing doors 16, 17, operated with being interlocked, are used as a door for changing the airflow between condenser 12 and bypass passage 12a. However, it goes without saying that one plate-type door, a film-type door or the like can be used as this door.

While the above-described embodiments refer to examples of usage of the present invention, it is understood that the present invention may be applied to other usage, modifications and variations of the same, and is not limited to the disclosure provided herein.

What is claimed is:

1. A refrigeration-cycle device comprising:
   an air-conditioning duct including an inlet drawing air in and an outlet blowing air into a passenger compartment;
   a blower blowing air into said air-conditioning duct;
   a compressor having a discharge port for discharging compressed refrigerant, intake port for intaking lower-pressure refrigerant in a refrigeration cycle and a gas-injection port intaking intermediate-pressure gas refrigerant in the refrigerant cycle;
   a condenser disposed within said air-conditioning duct which heats air with gas refrigerant during a heating mode, the gas refrigerant discharged from said compressor during said heating mode;
   a first depressurizing device which depressurizes higher-pressure refrigerant to an intermediate pressure refrigerant, said first depressurizing device depressurizing said higher-pressure refrigerant from one of two portions having passed through said condenser during the heating mode;
   a refrigerant-refrigerant heat exchanger where heat exchange is performed between a second of said two portions of the higher-pressure refrigerant having passed through said condenser and the intermediate-pressure refrigerant having passed said first depressurizing device;
   a supercooling device disposed within said air-conditioning duct which supercools the higher-pressure refrigerant from said second of said two portions during said heating mode, said supercooling device supercooling by heat exchange between the higher-pressure refrigerant flowing thereinto and air within said air-conditioning duct;
   a second depressurizing device which depressurizes the higher-pressure refrigerant supercooled in said supercooling device, said second depressurizing device depressurizing said higher-pressure refrigerant to a lower pressure; and
   an outdoor heat exchanger which evaporates the lower-pressure refrigerant having passed through said second depressurizing device during the heating mode;
   wherein intermediate-pressure gas refrigerant is introduced into said gas-injection port of said compressor, the intermediate-pressure gas refrigerant being vaporized by heat exchange in said refrigerant-refrigerant heat exchanger during said heating mode.

2. The refrigeration-cycle device according to claim 1, wherein:
   an evaporator is disposed upstream of said condenser in an airflow direction in said air-conditioning duct;
   a third depressurizing device is disposed on the inlet side of the refrigerant passage of said evaporator; and
   during a cooling mode, the higher-pressure gas refrigerant from said compressor is condensed in said outdoor heat-exchanger, the higher-pressure gas refrigerant having passed through said outdoor heat-exchanger is depressurized to a lower pressure by said third depressurizing device, and the lower-pressure refrigerant is vaporized at said evaporator.

3. The refrigeration-cycle device according to claim 2, wherein:
   during a dehumidifying mode, air cooled by said evaporator is heated by said condenser by condensing the higher-pressure refrigerant in said condenser and vaporizing the lower-pressure refrigerant in said evaporator.

4. The refrigeration-cycle device according to claim 1, wherein:
   said condenser, said refrigerant-refrigerant heat exchanger, said first depressurizing device and said supercooling device are integrated as a heat exchanger.

5. The refrigeration-cycle device according to claim 1, further comprising:
   an inside air passage and an outside air passage provided within said air-conditioning duct; and
   said supercooling device being disposed within said outside air passage.

6. The refrigeration-cycle device according to claim 5, wherein:
   said supercooling device is disposed upstream of said condenser in an airflow direction in said outside air passage.

7. The refrigerant-cycle device according to claim 5, wherein:
   said supercooling device is disposed within said outside air passage;
   said condenser is disposed within inside air passage; and
   said supercooling device and said condenser are integrated as a heat exchanger.

8. A refrigeration-cycle device comprising:
   an air-conditioning duct having an inlet for drawing in air and an outlet for blowing air into a passenger compartment;
   a blower for blowing air into said air-conditioning duct;
   a compressor having a discharge port that discharges compressed refrigerant, an intake port that draws in lower-pressure refrigerant in a refrigeration cycle and gas-injection port that draws intermediate-pressure gas refrigerant in the refrigerant cycle;
   a condenser disposed within said air-conditioning duct for heating air with gas refrigerant flowing therein, the gas refrigerant discharged from said compressor during a heating mode;
   a first depressurizing device 26 for depressurizing higher-pressure refrigerant to an intermediate pressure refrigerant, the higher-pressure refrigerant having passed through said condenser during the heating mode;
   a gas-liquid separator that separates gas and liquid intermediate-pressure refrigerant that passed through said first depressurizing device during the heating mode;

supercooling device disposed within said air-conditioning duct for supercooling the intermediate-pressure liquid refrigerant by heat exchange between the intermediate-pressure liquid refrigerant flowing thereinto and air within said air-conditioning duct, the intermediate-pressure liquid refrigerant having been separated in said gas-liquid separator during the heating mode;

a second depressurizing device for depressurizing the intermediate-pressure refrigerant to a lower pressure, the intermediate-pressure refrigerant having been supercooled at said supercooling device; and an outdoor heat exchanger for gasifying the lower-pressure refrigerant having passed through said second depressurizing device during the heating mode;

wherein intermediate-pressure gas refrigerant is introduced into said gas-injection port, the intermediate-pressure gas refrigerant is separated from the intermediate-pressure refrigerant in said gas-liquid separator during the heating mode.

9. The refrigeration-cycle device according to claim 8, wherein:

an evaporator is disposed upstream of said condenser in an airflow direction in said air-conditioning duct;

a third depressurizing device is disposed on the inlet side of the refrigerant passage of said evaporator; and during a cooling mode, the higher-pressure gas refrigerant from said compressor is condensed in said outdoor heat-exchanger, the higher-pressure gas refrigerant having passed through said outdoor heat-exchanger is depressurized to a lower pressure by said third depressurizing device, and the lower-pressure refrigerant is vaporized at said evaporator.

10. The refrigeration-cycle device according to claim 9, wherein:

during a dehumidifying mode, air cooled by said evaporator is heated by said condenser by condensing the higher-pressure refrigerant in said condenser and vaporizing the lower-pressure refrigerant in said evaporator.

11. The refrigeration-cycle device according to claim 8, further comprising:

an inside air passage and an outside air passage provided within said air-conditioning duct; and said supercooling device being disposed within said outside air passage.

12. The refrigeration-cycle device according to claim 11, wherein:

said supercooling device is disposed upstream of said condenser in an airflow direction in said outside air passage.

13. The refrigerant-cycle device according to claim 11, wherein:

said supercooling device is disposed within said outside air passage;

said condenser is disposed within inside air passage; and said supercooling device and said condenser are integrated as a heat exchanger.

* * * * *